United States Patent
Barnett et al.

[11] Patent Number: 5,918,908
[45] Date of Patent: Jul. 6, 1999

[54] ADVERTISEMENT PAGE WITH INCORPORATED SAMPLE MATERIAL WHICH CAN BE TRIMMED TO FIT FLUSH WITH THE EDGES OF A PUBLICATION AND METHODS OF MAKING SAME

[75] Inventors: Roger Barnett, New York, N.Y.; Hubert F. Brown, Charleston; Lyudmila Feldman, Signal Mountain, both of Tenn.

[73] Assignee: Arcade, Inc., Chattanooga, Tenn.

[21] Appl. No.: 08/807,097

[22] Filed: Feb. 27, 1997

[51] Int. Cl.$^6$ .................................................. B42D 15/00
[52] U.S. Cl. ........................... 283/56; 283/15.1; 283/105; 283/117
[58] Field of Search ........................... 283/56, 15.1, 105, 283/117; 206/204, 205, 581, 527, 232, 459.5, 823; 428/905, 166, 172, 126, 40.1, 40.2, 43; 270/5.02, 5.03

[56] References Cited

U.S. PATENT DOCUMENTS

| | | |
|---|---|---|
| Re. 33,299 | 8/1990 | Sweeny et al. . |
| 3,685,734 | 8/1972 | Paciorek et al. . |
| 3,866,900 | 2/1975 | Kebba ..................................... 270/5.02 |
| 4,606,956 | 8/1986 | Charbonneau et al. ................. 428/905 |
| 4,752,496 | 6/1988 | Fellows et al. . |
| 4,789,187 | 12/1988 | Corlew et al. . |
| 4,889,755 | 12/1989 | Charbonneau . |
| 4,925,517 | 5/1990 | Charbonneau et al. . |
| 4,925,667 | 5/1990 | Fellows et al. . |
| 5,028,074 | 7/1991 | Hoolt . |
| 5,050,910 | 9/1991 | Schechter et al. ..................... 283/56 X |
| 5,072,931 | 12/1991 | Parrotta et al. ........................ 283/56 X |
| 5,098,127 | 3/1992 | Williamson et al. . |
| 5,139,286 | 8/1992 | Gold . |
| 5,141,254 | 8/1992 | Ring . |
| 5,160,022 | 11/1992 | Mennella . |
| 5,188,236 | 2/1993 | Sayers et al. .......................... 283/56 X |
| 5,248,537 | 9/1993 | Giannavola ............................. 428/905 |
| 5,389,174 | 2/1995 | Hibsch et al. ......................... 283/56 X |
| 5,407,233 | 4/1995 | Wilen . |
| 5,419,958 | 5/1995 | Charbonneau . |
| 5,637,401 | 6/1997 | Berman et al. ......................... 428/905 |
| 5,645,161 | 7/1997 | Whitaker et al. ....................... 428/905 |

*Primary Examiner*—Frances Han

[57] ABSTRACT

An advertisement page for binding to or within a publication, comprising a first opposing layer; a second opposing layer attached to the first opposing layer; and a sample material disposed between the first and second opposing layers, wherein an edge of the advertisement page is flush with the outside edge of the pages of the publication. The present invention also relates to an advertisement page with offset and attachment characteristics which allow it to be bound within a publication such that an edge of the advertisement page is flush with the outside edge of the pages of the publication, wherein sample material is maintained between two opposing layers formed from one continuous sheet which has been folded and which may be trimmed at the fold line. The present invention also relates to methods of making such advertisement pages.

13 Claims, 8 Drawing Sheets

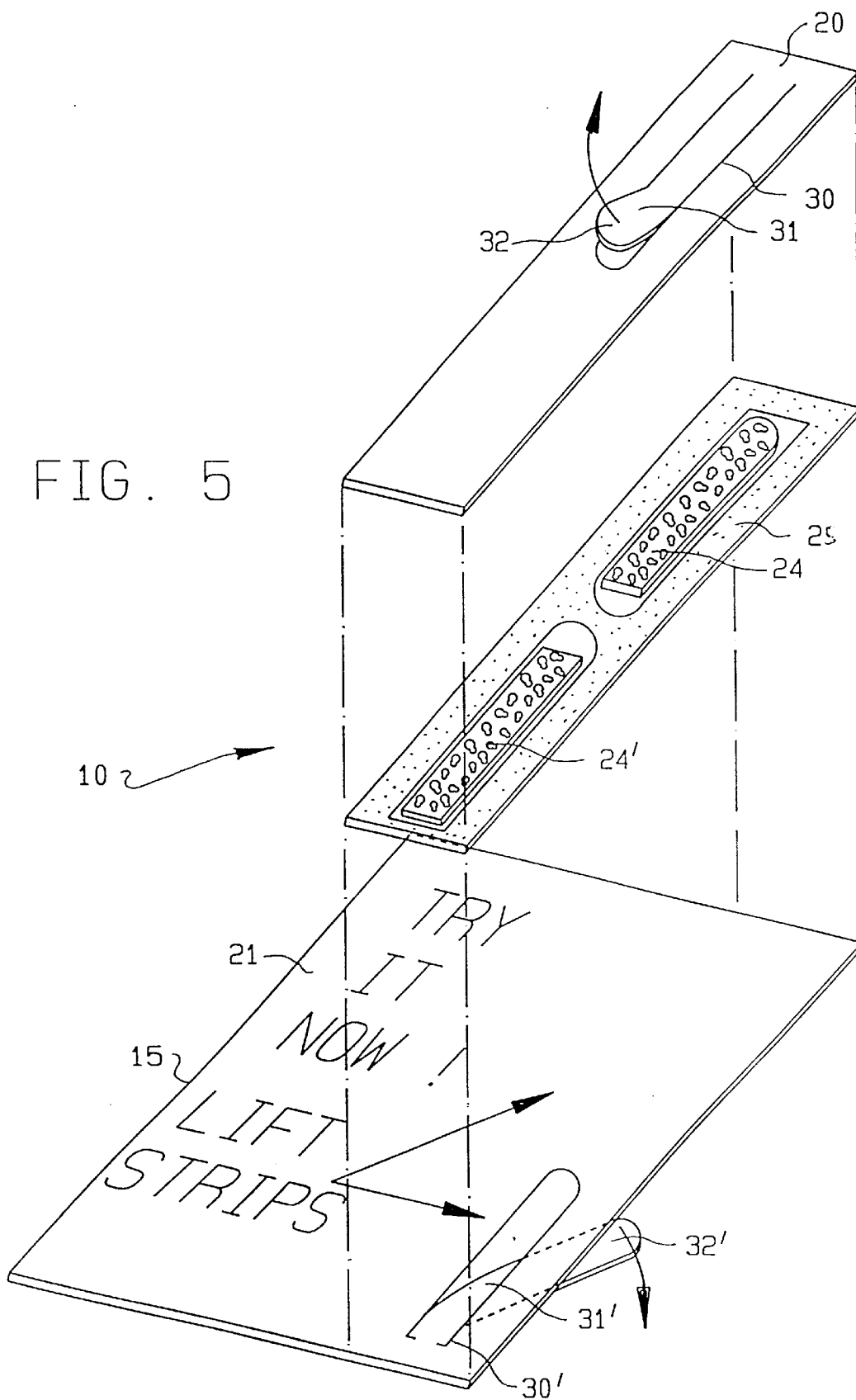

ADVERTISEMENT PAGE WITH INCORPORATED SAMPLE MATERIAL WHICH CAN BE TRIMMED TO FIT FLUSH WITH THE EDGES OF A PUBLICATION AND METHODS OF MAKING SAME

FIELD OF INVENTION

The present invention relates generally to an advertisement page which has been or may be trimmed such that an edge of the advertisement page is flush with the outside edge of a bound publication. More specifically, the present invention relates to an advertisement page having a sample material which is offset from at least one edge of the page in addition to attachment characteristics which allow it to be trimmed to be bound flush within a publication. The advertisement page generally comprises two opposing layers of material and a sample material incorporated between the layers. The present invention also relates to a method of making a trimmable advertisement page and a bound advertisement page wherein an edge of the advertisement page is flush with the outside edge of the pages within the publication.

BACKGROUND OF INVENTION

Manufacturers of a variety of products often distribute small samples of their products to potential customers. This is often accomplished by incorporating samples into advertisement pages which are then bound within publications such as magazines and catalogs. This is an especially popular method of advertising and promoting perfumes and cosmetics.

In these advertisement pages, the sample material is usually enclosed between two panels or flaps of paper which are typically formed from one continuous sheet by folding it over the sample material, which is located near the unbound edge of the sheet. Depending upon the design of the device, the consumer either lifts one of the panels or removes a perforated tear strip to expose or access the sample material.

The current practice is to make these advertisement pages narrower or smaller than the publication or magazine pages. This is a consequence of the way magazines are typically bound. When a magazine is first assembled, its untrimmed pages typically extend beyond the length and width of the finished magazine size. The excess on the top, side, and bottom of the magazine pages is then cut off to prepare the magazine. If the advertiser's sample, which is frequently situated at the outside edge of the advertisement, extends beyond the borders of the finished magazine page, the sample area may be breached by the page trimming process, or the unbound panel may become unintentionally detached from the magazine.

In order to avoid this consequence, advertisers manufacture advertisement pages to be smaller than the size of a normal magazine page. This results in a number of disadvantages. First, after paying for an entire page of advertising, the advertiser fails to use the maximum area of the page in creating the advertisement. Thus, the impact on the customer and the amount of information transmitted is reduced. Secondly, an advertiser spends a large amount of time and money designing an attractive and effective advertisement in which to deliver its sample material. Ideally, this advertisement should stand alone in the consumer's field of vision when the consumer looks at the page, in order to direct as much attention as possible to the advertising material and to encourage the consumer to try the sample material. However, with the current method of advertisement page construction, the border of the sample advertisement is surrounded by the magazine text or advertisement which appears on the subsequent page, and this lessens the impact of the advertiser's message on the consumer.

Another problem encountered in the construction of folded-sheet advertisement pages is that the equipment and process used to fold the page can have detrimental effects on the page. For example, a folding device can cause unsightly wrinkling or creasing of the page near the fold line. Furthermore, although it is desirable to position certain sample materials, such as fragrance samples, near the fold line, a sample material so positioned may be damaged by the folding device. If the sample material is a microencapsulated fragrance, some of the microcapsules may be crushed, resulting in unwanted premature release of the fragrance.

There are a number of sampler devices in the prior art. For example, U.S. Pat. No. 5,188,236 to Sayers et al. discloses a z-shaped scent sampler for use in magazines. Similarly, U.S. Pat. No. 4,925,667 to Fellows et al. discloses a method of binding cosmetic samples to a substrate for use in magazine inserts and the like. In addition, U.S. Pat. No. 5,050,910 to Schechter et al. discloses a complex, multi-layered sampler device in which part of the device must be entirely removed from the publication before the material can be sampled.

The prior art does not disclose an advertisement page which may span the entire area of a publication page and which comprises a simple two-layer construction to contain sample material. Also, the prior art does not disclose an advertisement page which may be constructed by folding but avoids the unsightly appearance and damage to the sample material that folding can cause. Therefore, there is a need for an advertisement page bound within a publication having an edge which is flush with the outside edge of the publication pages and which thereby spans the entire area of the publication pages. There is also a need for a trimmable advertisement page which may be bound flush within a publication. There is also a need for an efficient and economical method of making such advertisement pages.

SUMMARY OF THE INVENTION

The present invention relates to an advertisement page bound to or within a plurality of pages such as are found within a publication wherein an edge of the advertisement page is flush with the outside edge of the pages of the publication. The advertisement page generally comprises three major elements: a first opposing layer; a second opposing layer attached to the first opposing layer; and a sample material disposed between the first and second opposing layers. The advertisement page also may contain more than one sample material between its opposing layers.

The present invention also relates to a dual advertisement page bound within a plurality of pages, comprising two portions of sample material, in which the first portion of sample material is disposed between a first opposing layer and a second opposing layer which are attached to each other and the second portion of sample material is disposed between the first opposing layer and a third opposing layer which are attached to each other. This dual advertisement page has two outside edges which are flush with the outside edge of the plurality of pages.

The present invention also relates to an advertisement page having sample material which is offset from an outside edge of the page in addition to attachment characteristics which allow it to be bound within a publication and trimmed such that the outside edge of the advertisement page is flush with the outside edge of the pages of the publication. The advertisement page comprises sample material offset from the outside edge of the advertisement page and disposed between a first opposing layer and a second opposing layer. The first opposing layer is removably attached to the second opposing layer, and one opposing layer may be peeled from the other in order to access the sample material. In alternative embodiments, there is a permanent attachment creating a hinge between the first and second opposing layers. In further alternative embodiments, the opposing layers may be reattached to each other.

The present invention also relates to a method of making an advertisement page within a publication, which has a plurality of pages with edges, generally comprising the steps of: depositing sample material onto a first opposing layer, attaching a second opposing layer to the first opposing layer, such that the second opposing layer covers the sample material; binding one of the two opposing layers into the publication; and trimming the two opposing layers such that the advertisement page is flush with the outside edge of the pages of the publication.

In addition, the present invention relates to a method of making a trimmable advertisement page, generally comprising the steps of: depositing sample material onto a first opposing layer; attaching a portion of a top layer to the first opposing layer, such that sample material is located between the first opposing layer and the portion of the top layer; die cutting the top layer around the portion of the top layer, thereby forming a second opposing layer; and removing portions of the top layer other than the second opposing layer.

Finally, the present invention relates to a method of making a trimmable advertisement page, comprising the steps of: depositing sample material onto one of a first opposing layer and a second opposing layer, wherein the first opposing layer and the second opposing layer are attached at a fold line; applying permanent adhesive between the sample material and the fold line thereby creating a hinge between the first and second opposing layers; and folding and attaching the first opposing layer to the second opposing layer such that the sample material is located between the two opposing layers, wherein the permanent adhesive maintains a permanent attachment between the two opposing layers.

BRIEF DESCRIPTION OF THE DRAWINGS

Reference is next made to a brief description of the drawings, which are intended to illustrate a number of embodiments of the advertisement page and methods of making the advertisement page according to the present invention. The drawings and detailed descriptions which follow are intended to be merely illustrative, and are not intended to limit the scope of the invention as set forth in the appended claims.

FIG. 5 is a perspective view of a fifth embodiment of the advertisement page having two tear strips;

DETAILED DESCRIPTION OF THE ADVERTISEMENT PAGE

Figure 1A:
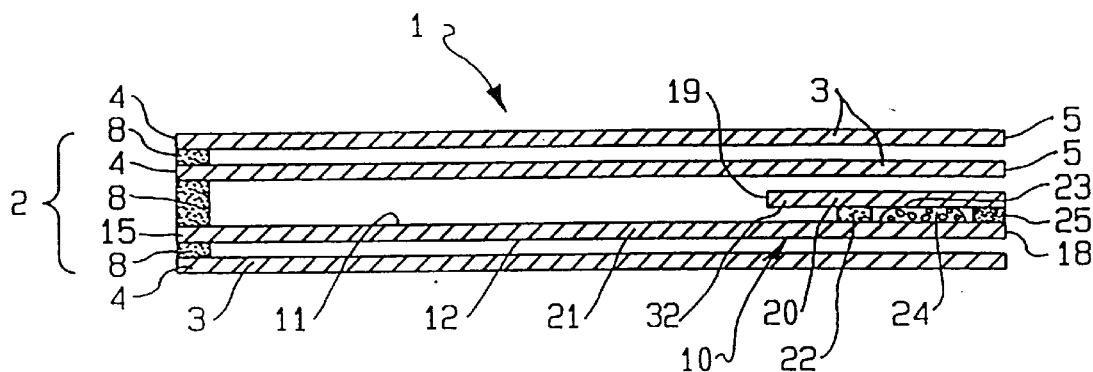
FIG. 1a is a cross-sectional view of a first embodiment of the advertisement page bound within a publication.
Figure 1B:
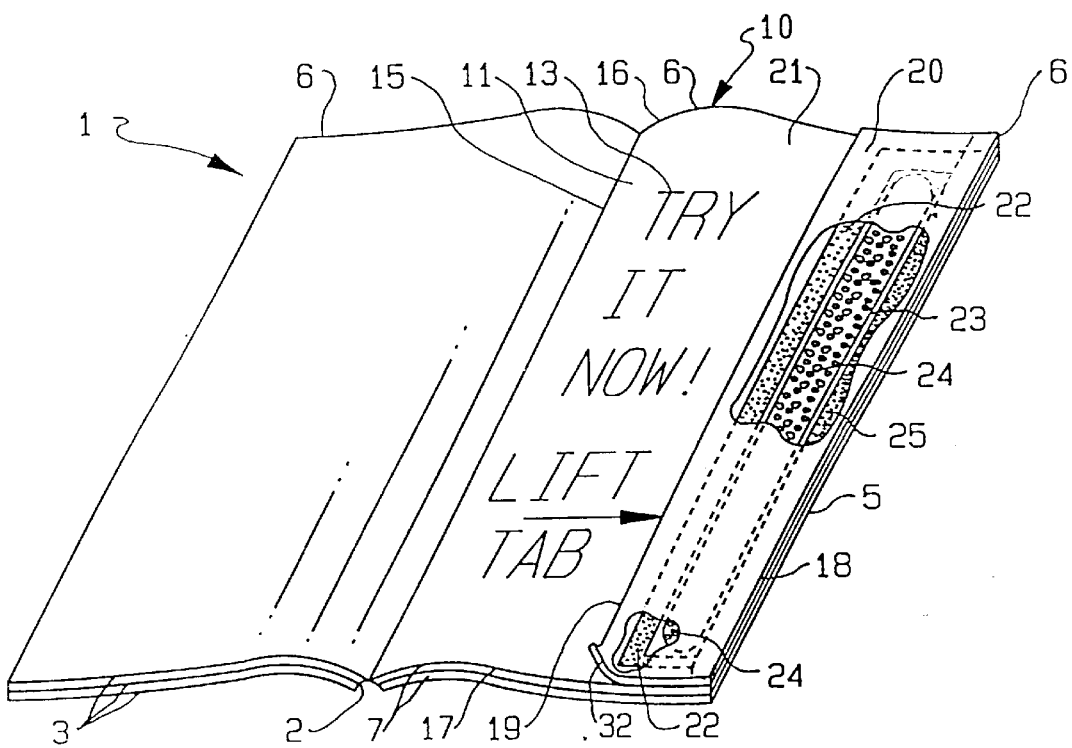
FIG. 1b is a perspective view of the first embodiment showing the publication opened to expose the advertisement page.

FIGS. 1a and 1b represent a bound publication 1 containing an advertisement page 10 according to the first embodiment of the present invention. As shown in FIG. 1a, the publication 1 comprises a number of pages 3 and an advertisement page 10. The pages 3 are joined together at their inside edges 4 to form spine 2. The pages 3 are joined together by binding means 8, which may comprise staples, glue, tape, or any other suitable binding means. As shown, the advertisement page 10 is also bound to spine 2 at its inside edge 15 to become part of the publication 1. A single publication may contain more than one advertisement page, and the advertisement pages may be placed at the front and back covers of the publication as well as inside the publication 1.

As shown in FIGS. 1a and 1b, outside edge 18 of the advertisement page 10 is flush with outside edge 5 of the pages 3 of the publication 1. Although not necessary, top edge 16 of the advertisement page 10 is also flush with top edges 6 of the pages 3 of the publication 1, and bottom edge 17 of the advertisement page 10 is flush with bottom edges 7 of the pages 3 of the publication 1. Thus, when the publication 1 is opened to expose the advertisement page 10, the subsequent page 3 of the publication 1 is not visible to the reader as it is completely covered by the advertisement page 10.

As shown in FIGS. 1a and 1b, the advertisement page 10 comprises a first opposing layer 21 and a second opposing layer 20. The first and second opposing layers 21, 20 comprise materials suitable to be bound within the publication and which will withstand the manufacturing process, shipping and handling. The layers preferably comprise paper, but may comprise any other suitable material. If desired, the layers may be treated or coated for various purposes, including improved adhesion, de-adhesion, or to prevent migration of the sample material. The treatments or coatings may be applied continuously or discontinuously. The contour of the inside edge 19 of the second opposing layer 20 may be a straight line, a curved line, a zigzag, or any other decorative shape.

The first and second opposing layers 21, 20 are separate pieces. However, they may be formed from a single, continuous sheet of material which has been folded over and then trimmed to form two separate pieces or layers. The first and second opposing layers 21, 20 are joined together by both a peelable adhesive 22 and a permanent adhesive 25. In order to expose or access the sample material 24, the user peels the second opposing layer 20 from the first opposing layer 21, thereby breaking the bond created by the peelable adhesive 22. The user may peel the second opposing layer 20 from the first opposing layer 21 up to the permanent adhesive 25 which acts as a hinge, maintaining the attachment between the two opposing layers 21, 20.

In the first embodiment, sample material 24 is a microencapsulated fragrance. Alternatively, sample material 24 may be a cosmetic. Cosmetics include any external application intended to beautify or improve the complexion, skin, or hair. These include, for example, lipsticks, powders, foundations, mascaras, blushes, and eyeshadows. In addition to fragrances and cosmetics, a wide variety of sample materials may be included in the present invention, such as personal care products or medical treatments. The sample materials may be presented in various forms, such as a pure product or a product which is microencapsulated, contained in a matrix material, or which is in gel or powder form.

The sample material 24 is maintained within sample area 23 between the first and second opposing layers 21, 20. The cosmetic sample material 24 may be bonded to either or both of the first and second opposing layers 21, 20. In addition, the cosmetic may contain a special treatment or cover to keep it from attaching to one or both of the opposing layers 21, 20. In this embodiment, there is only one sample area 23, which is located near the outside edge 18 of the advertisement page 10. In alternative embodiments, there may be more than one sample area, and sample areas may be located anywhere between the two opposing layers 21, 20.

Figure 2:
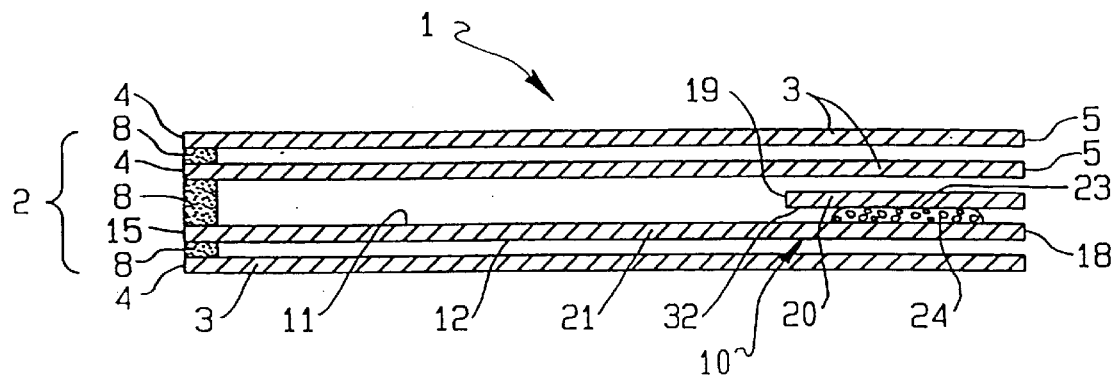
FIG. 2 is a cross-sectional view of a second embodiment of the advertisement page which includes a microencapsulated fragrance and no additional adhesive.

In the second embodiment illustrated in FIG. 2, the sample material 24 is also a microencapsulated fragrance. This microencapsulated fragrance includes an adhesive binder which serves not only to bind the microcapsules of fragrance to each other, but also serves to attach the fragrance to the opposing layers 21, 20. The two opposing layers 21, 20 are attached together solely by means of the adhesive binder; therefore, no additional adhesive is required. Alternatively, areas of peelable adhesive may be disposed between or among discontinuous areas of sample material 24.

Figure 3:
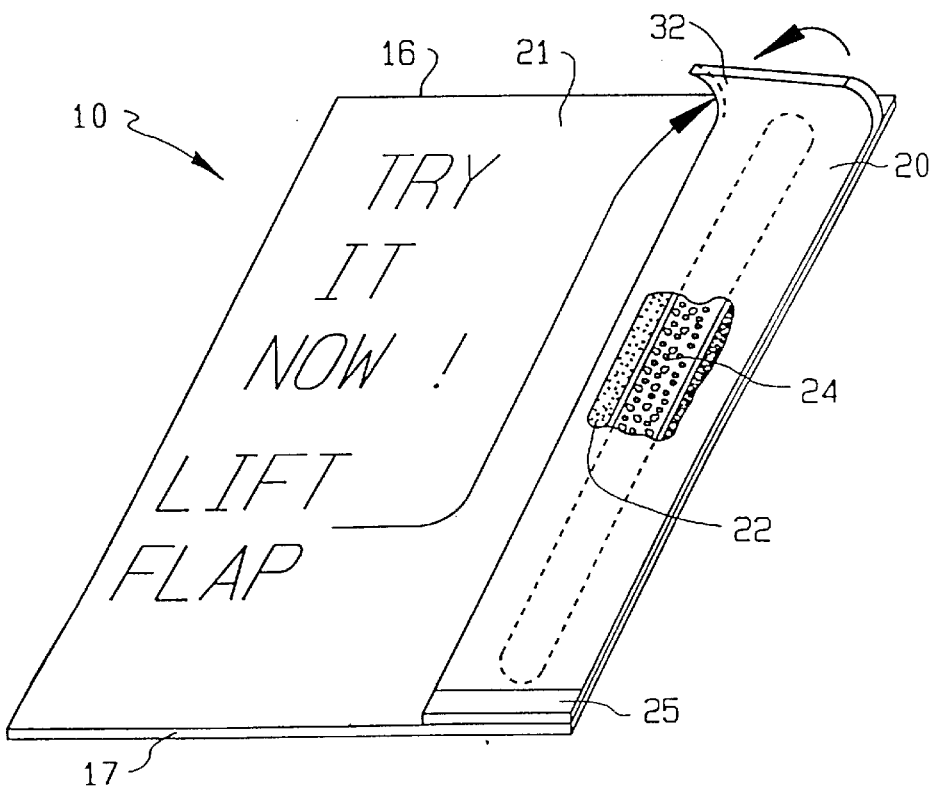
FIG. 3 is a perspective view of a third embodiment of the advertisement page.

In the first embodiment shown in FIGS. 1a and 1b, there is a strip of permanent adhesive 25 near the outside edge 18 of the advertisement page 10 to maintain the hinged attachment between the two opposing layers 21, 20. A flap 32 is provided on the opposite or inside edge 19 of the second opposing layer 20. The flap 32 is unattached to the first opposing layer 21 in order to facilitate detachment of the second opposing layer 20 from the first opposing layer 21. The permanent adhesive 25 and the flap 32 may be placed at alternative locations between the opposing layers 20, 21. For example, in the third embodiment illustrated in FIG. 3, the permanent adhesive 25 is provided near the bottom edge 17 of the advertisement page 10, with a flap 32 located near the top edge 16 of the advertisement page 10. Alternatively, the permanent adhesive 25 may be provided near the top edge 16 of the page 10, with a flap 32 located near the bottom edge 17. Alternatively, permanent adhesive 25 may be provided near the inside edge 19 of the second opposing layer 20, with a flap 32 located near the outside edge 18. Furthermore, while the flap 32 shown in FIGS. 1a and 1b comprises a strip which spans the entire length of the second opposing layer 20, the flap 32 may be of various shapes. For example, the flap 32 may comprise a small triangle-shaped area at a corner of the second opposing layer 20. Also, more than one sample material may be incorporated into the advertisement page. Multiple sample materials may be accessed by lifting a single flap, or each sample material may have a flap associated with it.

The peelable adhesive 22 reinforces the attachment between the two opposing layers 21, 20 and provides protection for the sample material 24, yet it allows the advertisement page 10 to be easily opened. Together, the strip of permanent adhesive 25 and the peelable adhesive 22 surround the sample material 24 as shown in FIG. 1b. Alternatively, the peelable adhesive 22 may completely surround the entire sample area 23 or portions of it. In addition, the peelable adhesive 22 may be applied in discrete portions or spots. The peelable adhesive 22 also may be resealable to allow repeated use of the page 10.

In alternative embodiments, a strip of permanent adhesive may be located between the two opposing layers 21, 20 across the center of the page, thereby dividing the second opposing layer 20 into two segments. One sample material may be located underneath the top segment of the second opposing layer 20 of the page 10 and a second sample material may be located underneath the bottom segment of the second opposing layer 20 of the page 10 and the second opposing layer 20 may be provided with two flaps, one near the top edge 16 of the page 10 and the other near the bottom edge 17 of the page 10. The user may then peel back the top segment of the second opposing layer 20 in order to expose the first sample material and the bottom segment of the second opposing layer 20 in order to expose the second sample material. The strip of permanent adhesive across the center of the page 10 will maintain the attachment between the first and second opposing layers 21, 20. Alternatively, multiple strips of peelable adhesive may be located between the two opposing layers 21, 20, thereby defining a plurality of segments. The second opposing layer may be cross-cut to separate the segments. Each segment may have a flap, and sample material may be located underneath each segment. Alternatively, the second opposing layer is not cross-cut, and the multiple sample materials may be exposed by lifting a single flap. In this way, a plurality of sample materials may be delivered in a single advertisement page.

Figure 4A:
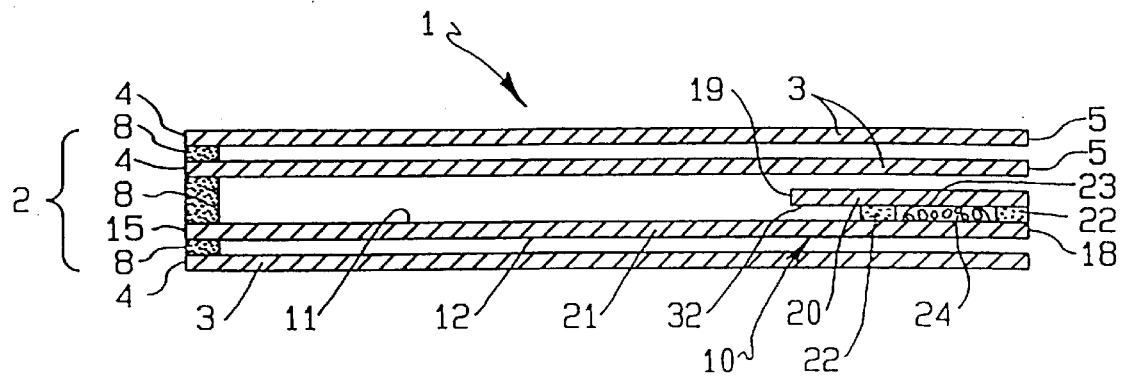
FIG. 4a is a cross-sectional view of a fourth embodiment of the advertisement page bound within a publication.
Figure 4B:
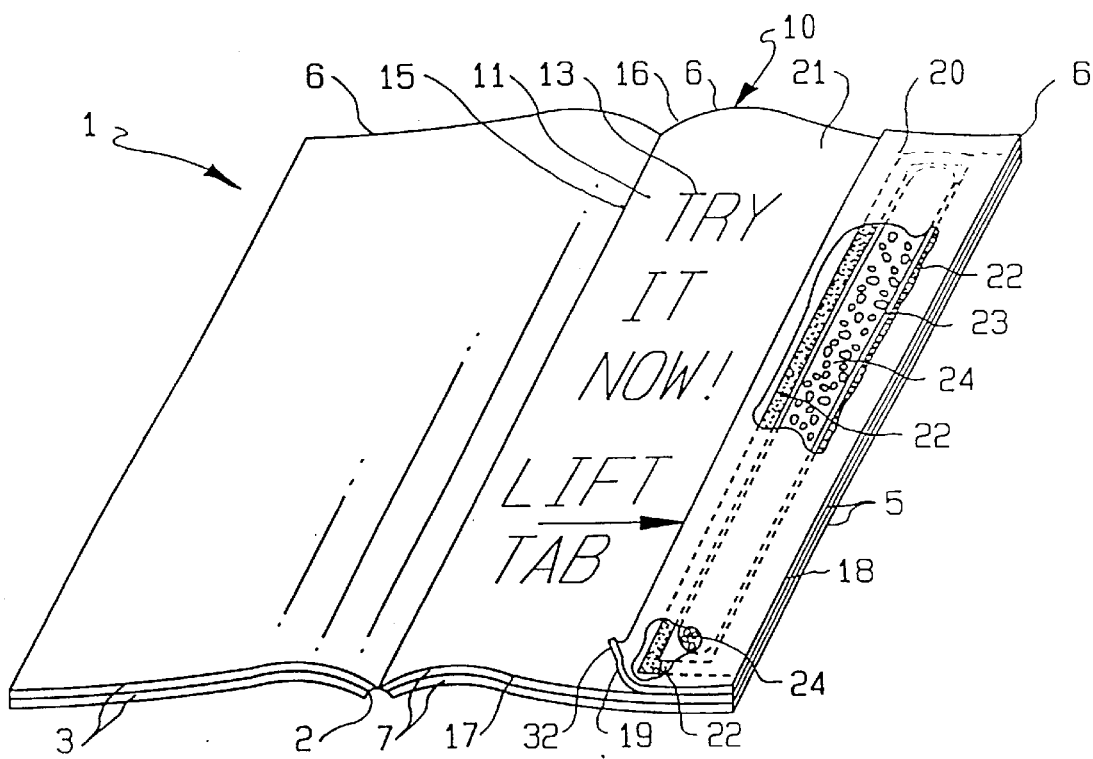
FIG. 4b is a perspective view of the fourth embodiment showing the publication opened to expose the advertisement page.

In the fourth embodiment illustrated in FIGS. 4a and 4b, a single band of adhesive 22 surrounds sample material 24 and attaches the first opposing layer 21 to the second opposing layer 20. The adhesive 22 must maintain the attachment between the first opposing layer 21 and the second opposing layer 20 as long as the advertisement page 10 is not in use. The adhesive 22 is also peelable, allowing the user to separate the first opposing layer 21 from the second opposing layer 20 to access the sample material 24. The user may completely separate the first opposing layer 21 from the second opposing layer 20. The adhesive 22 also may serve to enclose the sample material 24. For a sample material 24 which tends to migrate, the advertisement page 10 may require a substantially continuous band of adhesive 22, which completely encloses the sample area 23, as shown in FIG. 4b. Alternatively, adhesive 22 may be applied in alternative configurations, such as one or more bands, stripes, patches, or spots. Furthermore, in alternative embodiments, the adhesive 22 is not flush with the outside edge 18 of the advertisement page 10 as pictured in FIG. 4a, but is offset from the outside edge 18. The adhesive 22 may be applied in any pattern suitable to maintain the attachment of the first and second opposing layers 21, 20 and to maintain the sample material 24 between these layers.

The adhesive 22 may be resealable if desired, thereby allowing the user of the advertisement page 10 to reattach the second opposing layer 20 to the first opposing layer 21. In addition, a hermetic peelable seal may be included in the present invention to protect the sample material 24 from exposure to the atmosphere. Those skilled in the art will recognize that many different adhesives are suitable for use in the advertisement page 10. Some examples are glues or adhesives activated by heat, moisture, pressure, and ultraviolet or other radiation. In addition, the two opposing layers 21, 20 may be attached to each other using attachment means other than an adhesive, such as a heat seal bond.

As shown in FIGS. 1b and 4b, the front surface 11 of the advertisement page 10 may display advertising material 13 encouraging the reader to test the sample material 24. If the advertising material comprises a continuous design covering both the first and second layers 21, 20, it may be advantageous to provide a resealable advertisement page, such that the continuous design may be restored after the sample material is accessed. The back surface 12 of the advertisement page 11, which is shown in FIGS. 1a and 4a, also may display advertising material.

In the fourth embodiment pictured in FIGS. 4a and 4b, the second opposing layer 20 contains a flap 32 which is substantially similar to the flap 32 in the first embodiment pictured in FIGS. 1a and 1b. The reader can seize the flap 32 and pull it up, thereby breaking the peelable adhesive attachment between the first opposing layer 21 and the second opposing layer 20. The reader may then completely separate the second opposing layer 20 from the first opposing layer 21 in order to expose and then use the sample material 24. The flap 32 may be located anywhere along the edges of the second opposing layer 20. Alternatively, the advertisement page may incorporate more than one sample material. Multiple sample materials may be accessed by lifting a single flap, or the second opposing layer 20 may comprise multiple sections, and a separate flap may be provided for accessing each sample material.

A fifth embodiment of the present invention is shown in FIG. 5. In this embodiment, two different sample materials 24, 24' are deposited between the first opposing layer 21 and the second opposing layer 20. The two sample materials 24, 24' are maintained in separate areas between the opposing layers 21, 20 by adhesive 25 so that the sample materials 24, 24' do not come into contact or commingle with each other. A reader accesses sample materials 24, 24' by removing or peeling back tear strips 31, 31'. Preferably, the adhesive 25 is a permanent adhesive. Permanent glue, permanent tack glue, or a combination of both may be used. A peelable adhesive also may be used.

The tear strips 31, 31' are provided by creating a perforated or die-cut area 30 in the second opposing layer 20 and a perforated or die-cut area 30' in the first opposing layer 21. Both tear strips 31, 31' are provided with tabs 32, 32'. Tab 32 is unattached to first opposing layer 21 in order to facilitate the removal of tear strip 31, and tab 32' is similarly unattached to second opposing layer 20 in order to facilitate the removal of tear strip 31'. The perforated or die-cut areas 30, 30' may be shaped such that the tear strips 31, 31' remain attached to the advertisement page 10 after use, or alternatively they may be shaped such that the tear strips 31, 31' can be completely removed from the advertisement page 10. With this design, multiple samples can be delivered in a single advertisement page. It is also contemplated that an alternative embodiment providing a single sample material may also incorporate one or more tear strips to access the sample material. Alternatively, the sample material may be accessed by a plurality of tear strips located on the same side of the advertisement page or on opposite sides of the advertisement page as shown in FIG. 5.

In an embodiment incorporating perforated tear strips, adhesive is not necessary to hold the tear strips in place before use. However, in an embodiment incorporating die cut tear strips (in lieu of perforated tear strips), a peelable adhesive may be used to attach the tear strips to the opposing layers. In both embodiments, a resealable or re-closeable adhesive may be incorporated if the page is intended for repeated use.

In all of the embodiments discussed above, the inside edge 15 of the advertisement page 10 is bound into the spine 2. This is known in the art as "perfect" binding. However, there are alternative forms of binding to which the advertisement page 10 may easily be adapted. For example, the advertisement page may be made wider than the pages 3 depicted in FIG. 1a. This page would then be "saddle stitched" or stapled into the publication 1, thereby forming a narrow bindery lip which folds over the page when the publication 1 is closed.

Figure 6:
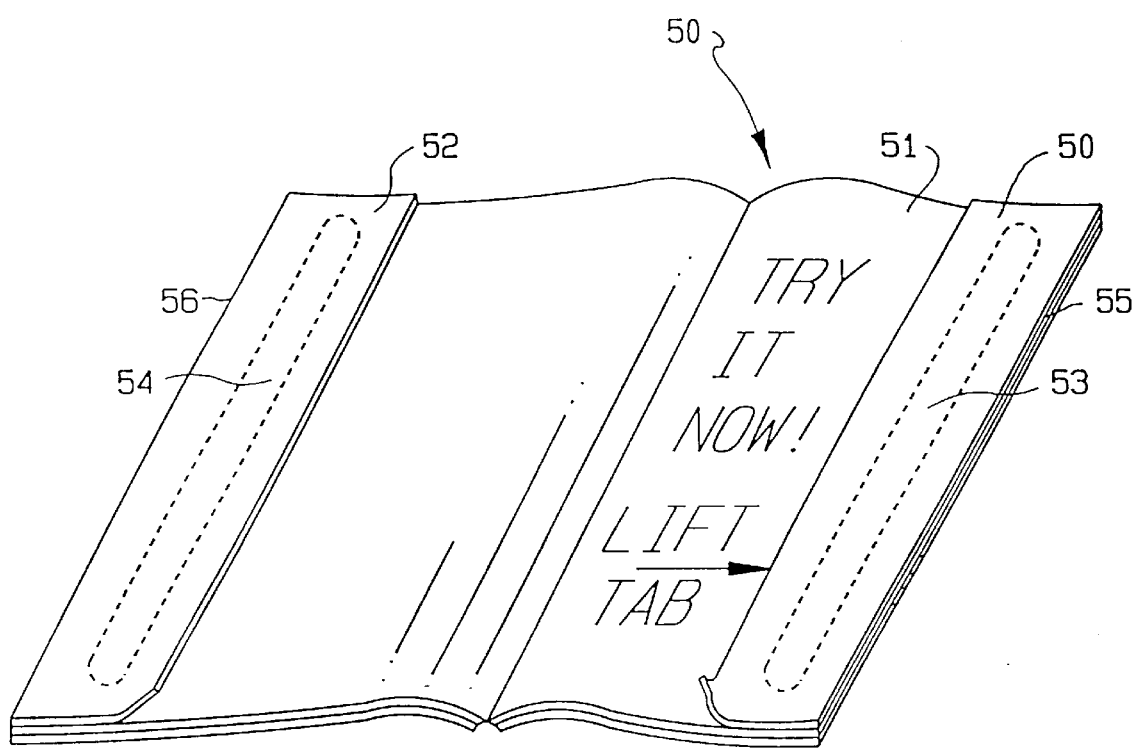
FIG. 6 is a perspective view of a sixth embodiment of the advertisement page having two portions of sample material maintained between a first opposing layer and a second and third opposing layer.

In addition, each of the embodiments discussed above is an example of a single fold advertisement pages in which there are two opposing layers 21, 20. The present invention also includes a dual advertisement page 50 as shown in FIG. 6. The dual advertisement page 50 essentially comprises a first opposing layer 51, a second opposing layer 50, a third opposing layer 52, and two portions of sample material 53, 54 (shown in phantom). The first opposing layer 51 is approximately the size of two pages. The first portion of sample material 53 is maintained between the first opposing layer 51 and the second opposing layer 50, which is attached to the first opposing layer 51 near one edge 55 of the first opposing layer 51, and the second portion of sample material 54 is maintained between the first opposing layer 51 and the third opposing layer 52, which is attached to the first opposing layer 51 near the opposite edge 56 of the first opposing layer 51. Each portion of sample material 53, 54 may comprise a single sample material or a plurality of sample materials. Such a page also may be saddle stitched or stapled into a publication.

Figure 7A:
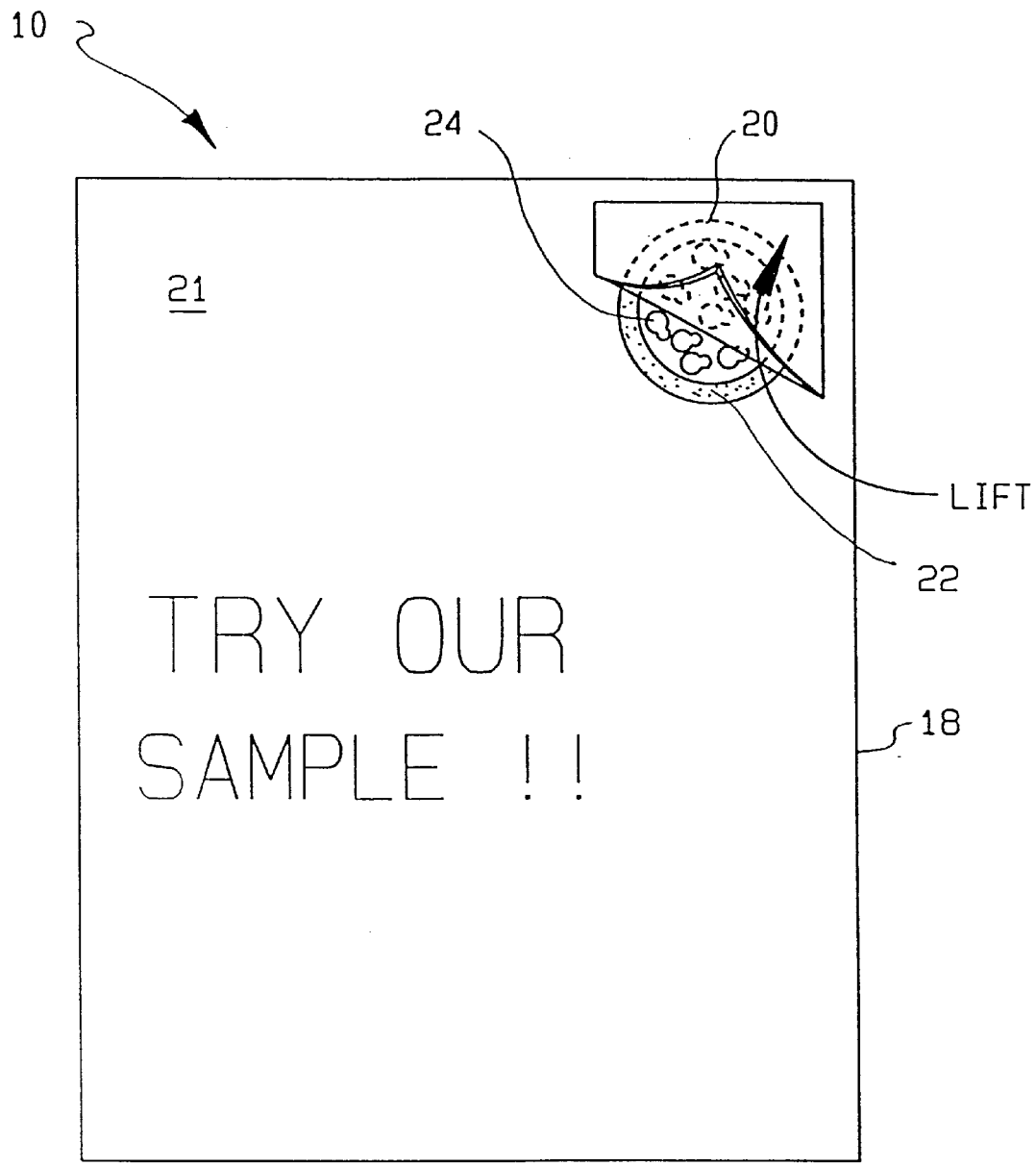
FIG. 7a is a top view of a seventh embodiment of the advertisement page which may be trimmed to be flush with pages within a publication.

In the seventh alternative embodiment shown in FIG. 7a, the advertisement page 10 is not bound within a publication but possesses certain characteristics which allow it to be bound within a publication such that at least the outside edge is flush with pages of the publication. This trimmable advertisement page 10 comprises sample material 24 disposed between a first opposing layer 21 and a second opposing layer 20. The sample material 24 is offset from the outside edge 18 of the advertisement page 10, and this offset allows the advertisement page to be trimmed without breaching or damaging the sample material 24.

The first and second opposing layers 21, 20 are two separate pieces, which are joined together by an adhesive 22. In this embodiment, a band of adhesive 22 encircles the sample material 24. Alternatively, in lieu of a continuous band, glue tips may be applied between the first and second opposing layers 21, 20. In order to expose or access the sample material 24, the user peels the second opposing layer 20 from the first opposing layer 21, thereby breaking the bond created by the adhesive 22. The user may then completely detach the second opposing layer 20 from the first opposing layer 21. The adhesive 22 may be a resealable to enable the user to reattach the second opposing layer 20 to the first opposing layer 21. Alternatively, the advertisement page may contain an area of permanent adhesive 25. As described above with respect to the embodiment pictured in FIGS. 1a, 1b, and 3, this permanent adhesive could act as a hinge, maintaining an attachment between the first and second opposing layers 21, 20. Adhesive 22 may not be necessary in embodiments in which the sample material 24 already contains adhesive material, such as certain cosmetic slurries. The peelable adhesive 22 may be resealable or, if desired, additional resealing means may be provided.

More than one sample material may be disposed between the two opposing layers. Alternatively, there may be a plurality of second opposing layers attached to one first opposing layer, and a separate sample material may be maintained between each second opposing layer and the first opposing layer.

Figure 7B:
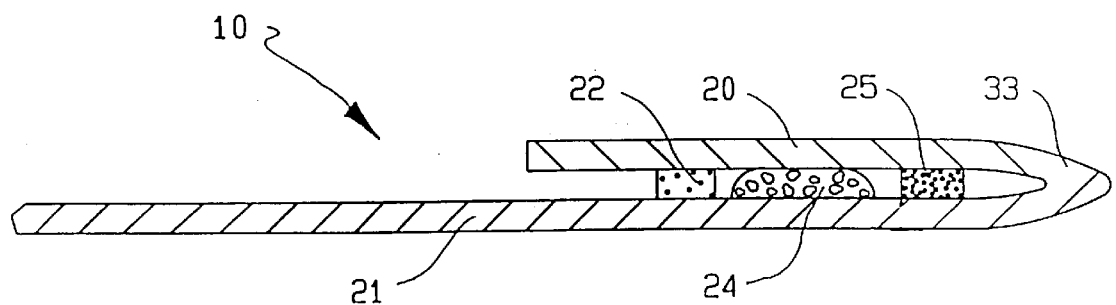
FIG. 7b is a cross-sectional view of an alternative embodiment having continuous first and second opposing layers.

As shown in FIG. 7b, the two opposing layers 21, 20 may be formed from one continuous layer folded at a fold line 33. In this embodiment, a strip of permanent adhesive 25 is placed between sample material 24 and the fold line 33. The permanent adhesive may or may not extend to the fold line 33. Both the permanent adhesive 25 and a peelable adhesive 22 maintain the attachment between the two opposing layers 21, 20. In order to access the sample material 24, the user may peel the second opposing layer 20 from the first opposing layer 21, thereby breaking the bond created by the peelable adhesive 22. However, the user may separate the opposing layers 21, 20 only to the strip of permanent adhesive 25. In lieu of folds found in conventional scent strip samplers, this embodiment relies on the permanent adhesive 25 to maintain a fixed bond or hinge between the opposing layers 21, 20.

Figure 7C:
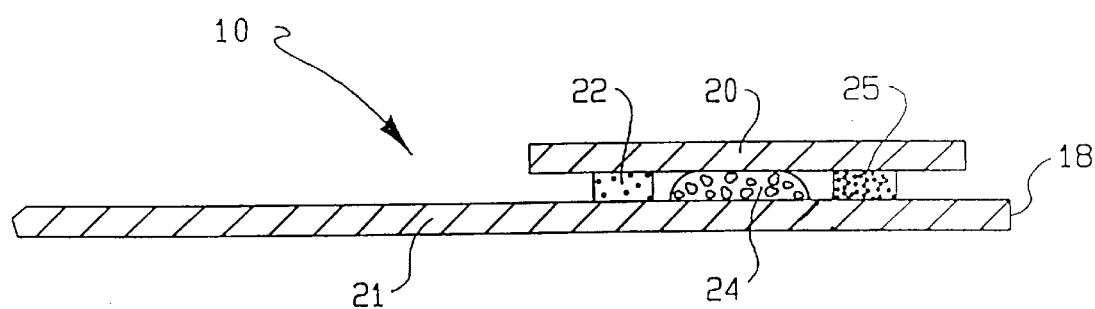
FIG. 7c is a cross-sectional view of an alternative embodiment having two separate opposing layers permanently attached to each other.

Permanent adhesive 25 also may be used in an advertisement page 10 having two separate opposing layers 21, 20 as shown in FIG. 7c. The permanent adhesive 25 may be placed anywhere between the two opposing layers 21, 20 as long as it does not interfere with use of the sample material 24.

In alternative embodiments, the permanent adhesive 25 may form configurations other than a straight strip. For example, it may form a wavy strip or a zigzag. In addition, in lieu of a continuous strip of permanent adhesive 25, which may not be necessary, permanent adhesive 25 may be discontinuously applied. Furthermore, the sample material 24 and the permanent adhesive 25 may be located anywhere on the first opposing layer 21, and the distance between the sample material 24 and the permanent adhesive 25 may be varied depending on the nature of the sample material and the desires of the manufacturer.

The permanent adhesive 25 protects the sample material 24 during the trimming process. The advertisement page may be trimmed anywhere from the fold line 33 or the outside edge 18 to the permanent adhesive 25. In fact, the advertisement page 10 may be trimmed along the permanent adhesive 25 as long as sufficient permanent adhesive remains to maintain the hinged attachment between the first and second opposing layers 21, 20.

The embodiments described herein generally comprise an advertisement page which has sample material located along its outside edge, and having an outside edge which is flush with or may be trimmed to be flush with the outside edge of the pages of a publication. It will be readily apparent to those skilled in the art, however, that the present invention may also be embodied in an advertisement page which has a sample material located along the top or bottom edge of the advertisement page, and wherein the top or bottom edge is flush with, or may be trimmed to be flush with, the top or bottom edge of the pages of a publication.

DETAILED DESCRIPTION OF THE METHOD OF MAKING THE ADVERTISEMENT PAGE

The present invention also relates to methods of making an advertisement page within a bound publication which is flush with the outside edge of the pages of the publication. The common method of making bound publications such as magazines is to arrange the printed pages in the proper order, bind them together with staples, glue, or other suitable binding material, and then trim the excess material from the edges of the pages to give the pages a uniform size. The present invention uses this process to create a bound publication containing an advertisement page which is flush with the outside edge of the pages of the publication.

Figure 8:
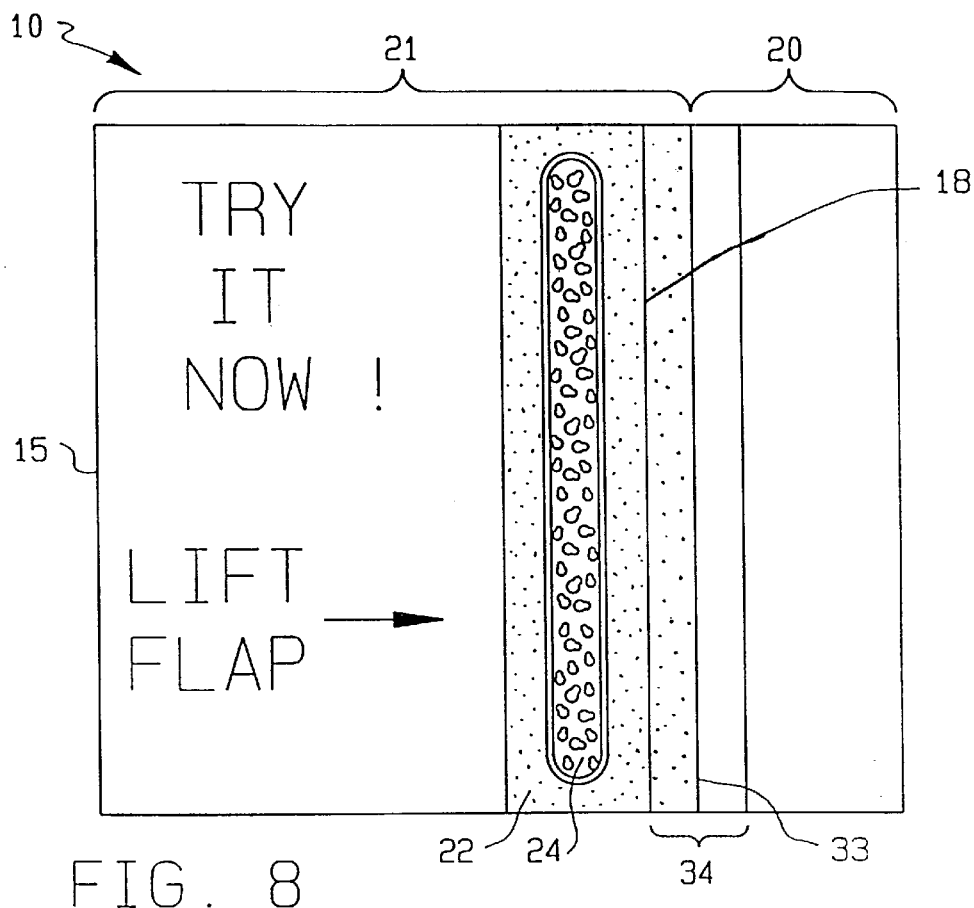
FIG. 8 is a plan view which illustrates a step in a method of making the advertisement page before the advertisement page has been folded and bound in the publication.

As shown in FIG. 8, the method of the present invention involves depositing adhesive 22 and sample material 24 onto the first opposing layer 21 of the advertisement page 10. Alternatively, the sample material 24 and/or adhesive 22 may be deposited onto the second opposing layer 20, or onto both of the opposing layers 21, 20, without affecting the utility of the method. Also, the adhesive may comprise peelable adhesive, permanent adhesive, or a combination of adhesives. The second opposing layer 20 is then brought into position over the sample material 24 by folding the second opposing layer 20 over the first opposing layer 21 at fold line 33 in advertisement page 10. The first and second opposing layers 21, 20 are attached to each other by means of the adhesive 22. Alternatively, the first opposing layer 20 and the second opposing layer 21 may be separate pieces which are subsequently joined together. Furthermore, the adhesive may comprise a permanent adhesive to create a hinge between the first and second opposing layers 21, 20, or a combination of different adhesives may be used.

In an alternative method, the sample material 24 may be applied to one of the two opposing layers 21, 20 and the adhesive 22 applied to the other of the two opposing layers 21, 20. Then, when the opposing layers 21, 20 are attached to each other, the sample material 24 and the adhesive 22 come into contact with each other. In an alternative method, adhesive may be applied to either opposing layer, followed by the application of the sample material to the same opposing layer on top of the adhesive, leaving sufficient adhesive exposed to maintain the attachment between the two opposing layers 21, 20. Alternatively, the sample material may be applied to either opposing layer, followed by the application of the adhesive to the same opposing layer, either partially or completely covering the sample material.

Figure 9:
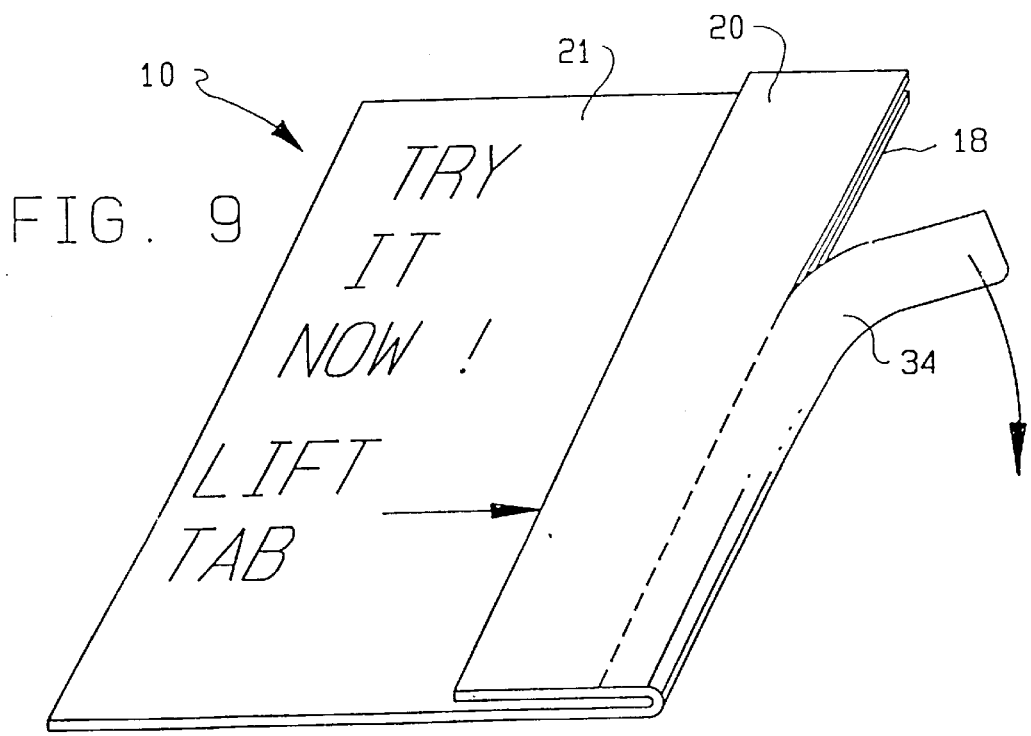
FIG. 9 is an illustration of the final step in the method of making the advertisement page of the present invention.

The advertisement page 10 is then bound at its inside edge 15 to pages 3 at spine 2, as shown in FIGS. 1a and 4a. As described above, there are a variety of different binding techniques, such as perfect binding, saddle stitching or stapling. The size of the unfinished advertisement page 10 is such that excess protruding material 34 would extend from the edge of the publication 1. Excess protruding material 34 may comprise page material (such as paper), and may further comprise excess adhesive 22. This excess protruding material 34 is cut and removed from the edge 18 of the advertisement page 10 as shown in FIG. 9. The result is a bound publication 1 in which the outside edge 18 of the advertisement page 10 is flush with the outside edge 5 of the pages 3 of the publication. Furthermore, if unsightly wrinkles have been formed in the excess protruding material 34 near the fold line 33, they will be removed when the excess protruding material 34 is trimmed, improving the appearance of the advertisement page.

The adhesive 22 and the sample material 24 are positioned on the advertisement page 10 such that when the cut is made along the outside edge 18, the sample material 24 is neither disturbed, exposed, nor damaged during the folding process. A similar method may be used to remove any excess material from the top and bottom edges of an advertisement page to make all edges of the page flush with the edges of the publication.

In addition, an embodiment such as is shown in FIG. 5 may be formed by the methods of the present invention. Tear strips 31, 31' are formed by perforating or die cutting sections in the opposing layers 21, 20. This step may be performed prior to depositing sample material 24 on either or both layers 21, 20. Alternatively, this step may be performed after the opposing layers 21, 20 are attached to each other.

The present invention also relates to methods of making trimmable advertisement pages, such as the trimmable advertisement pages described above. The method of making the trimmable advertisement page shown in FIG. 7a involves several steps. First, sample material 24 is deposited onto a first opposing layer 21. Sample material 24 is deposited such that it is offset from the outside edge 18 of the advertisement page 10. Next, a top layer (not shown) is laid over the sample material 24 and the first opposing layer 21. The top layer may be continuous with the first opposing layer 21 or it may be formed from a separate piece of material.

A portion of the top layer directly overlying the sample material 24 composes the second opposing layer 20. This second opposing layer 20 is attached to the first opposing layer 21 by adhesive 22, such that sample material 24 is located between the first opposing layer 21 and the second opposing layer 20. The adhesive 22 may be resealable, thereby allowing the user to reattach the second opposing layer 20 to the first opposing layer 21. Alternatively, both a peelable and permanent adhesive may be applied, allowing the user to peel the opposing layer 21, 20 apart to access the sample material 24 while maintaining the attachment between the layers 21, 20 during use.

The top layer is next die cut, thereby forming and separating the second opposing layer 20 from the rest of the top layer which is ultimately removed. If the top layer and the first opposing layer 21 are continuous, they ultimately will be separated during the manufacturing process. Advertisement may be printed on the first opposing layer 21, the second opposing layer 20, or both.

As long as the sample material 24 is offset from the outside edge 18 of the advertisement page 10, it may be deposited anywhere on the first opposing layer 21. In an alternative embodiment, more than one discrete portion of sample material 24 may be placed in several locations on the first opposing layer 21 and covered by several second opposing layers. These portions may all comprise the same sample material, or they may comprise a variety of different sample materials, enabling a user to sample many different products on one page.

The method of making the trimmable advertisement page shown in FIG. 7b involves substantially similar steps as described above with regard to the trimmable advertisement page shown in FIG. 7a. However, the first opposing layer 21 and the second opposing layer 20 are continuous and are attached at a fold line 33. Sample material 24 and a band of peelable adhesive 22 are applied to the first opposing layer 21 along with a strip of permanent adhesive 25 which is applied to the first opposing layer 21 approximately 0.25 inches from the fold line 33. The first opposing layer 21 is then folded over the second opposing layer 20, the sample material 24, and the adhesives 22, 25 at fold line 33. The advertisement page 10 may be distributed as is or may be trimmed flush with a publication without damaging the sample material 24.

What is claimed is:

1. An advertisement page bound to or within a plurality of pages of a publication, comprising a sample material disposed between opposing surfaces of a first opposing layer and a second opposing layer which are attached to each other, wherein each page of the publication has an outside edge and wherein the advertisement page has an outside edge which is flush with the outside edge of at least one page of the publication.

2. The advertisement page according to claim 1, wherein the two opposing layers are removably attached together, such that at least a portion of one of the two opposing layers may be detached from the other of the two opposing layers to access the sample material.

3. The advertisement page according to claim 2, wherein the portion of one of the two opposing layers may be reattached to the other of the two opposing layers.

4. The advertisement page according to claim 1, wherein the two opposing layers are removably attached together, such that one of the two opposing layers may be completely and entirely detached from the other of the two opposing layers to access the sample material.

5. The advertisement page according to claim 4, wherein the one of the two opposing layers may be reattached to the other of the two opposing layers.

6. The advertisement page according to claim 1, wherein the sample material is microencapsulated fragrance.

7. An advertisement page for binding to or within a publication, the publication comprising a plurality of pages and a spine, wherein each page has a plurality of edges, one of which is bound to the spine, wherein the advertisement page comprises:

a first opposing layer having a plurality of edges, one of which is bound to the spine of the publication, wherein an outside edge of the first opposing layer is flush respectively with an outside edge of the pages of the publication;

a second opposing layer attached to the first opposing layer and having a plurality of edges, wherein an outside edge of the second opposing layer is flush respectively with the outside edge of the first opposing layer; and sample material disposed between the first opposing layer and the second opposing layer, wherein at least a portion of the second opposing layer may be detached from the first opposing layer to access the sample material.

8. A dual advertisement page bound to or within a plurality of pages, comprising a first portion of sample material disposed between opposing surfaces of a first opposing layer and a second opposing layer which are attached to each other and a second portion of sample material disposed between opposing surfaces of the first opposing layer and a third opposing layer which are attached to each other, wherein the dual advertisement page has two outside edges which are flush with the outside edge of the plurality of pages.

9. An advertisement page, having an outside edge, comprising sample material disposed between a first opposing layer and at least one second discrete opposing layer, wherein the sample material is offset from the outside edge of the advertisement page and wherein the at least one second discrete opposing layer may be peeled apart and removed from the first opposing layer in order to access the sample material.

10. The advertisement page according to claim 9, herein at least one second opposing layer may be reattached to the first opposing layer.

11. The advertisement page according to claim 9, further comprising a permanent attachment between the first opposing layer and at least one second discrete opposing layer.

12. The advertisement page according to claim 11, wherein at least one second opposing layer may be reattached to the first opposing layer.

13. An advertisement page comprising sample material disposed between a first opposing layer and a second opposing layer, wherein the first opposing layer and the second opposing layer are attached at a fold line, wherein the first opposing layer is permanently attached to the second opposing layer by an adhesive placed between the sample material and the fold line to provide a hinge attachment between the first and second opposing layers in case the fold line is trimmed from the advertisement page, and wherein a portion of one of the two opposing layers may be detached from the other of the two opposing layers, both opposing layers remaining intact, in order to access the sample material.

\* \* \* \* \*